March 12, 1963 C. F. TURNER 3,080,714
GAS GENERATING CARTRIDGE CONTAINING LIQUID PROPELLANT
Filed March 1, 1960 2 Sheets-Sheet 1

INVENTOR.
CHARLES F. TURNER
BY Paul E. Rochford

INVENTOR.
CHARLES F. TURNER
BY Paul E. Rochford

United States Patent Office 3,080,714
Patented Mar. 12, 1963

3,080,714
GAS GENERATING CARTRIDGE CONTAINING LIQUID PROPELLANT
Charles F. Turner, Hamden, Conn., assignor to Olin Mathieson Chemical Corporation, a corporation of Virginia
Filed Mar. 1, 1960, Ser. No. 12,142
1 Claim. (Cl. 60—39.46)

The present invention relates to an article useful in the controlled generation of a rapidly flowing stream of hot gas. More particularly, it relates to a device useful in generating a jet of short duration capable of powering a device adapted to be activated by an impinging stream of rapidly moving hot gas.

The pressure developed by rapid conversion of a propellant powder into a gas gives a very high power production per unit weight of material employed. The energy release from a contained propellant can be used to do a greater amount of work on the container or other associated apparatus per unit weight of material used than practically any other form of energy source. One particular advantage of these propellant compositions is that they can be formed into an elongated shape which will have a constant burning rate as the combustion proceeds from one end to the other. Although a rapidly flowing stream of hot gas can be produced in this way, undesirable side effects make it unsuitable for certain uses. One such limitation is the contamination of the gas stream by particulate and corrosive by-products of the combustion. This may be due in part to the fact that incomplete combustion takes place before the burning portion of the propellant is carried from the main charge and out of the combustion zone. It is also due in part to the fact that carbonaceous solid particulate matter and corrosive gases are formed.

One object of this invention is to provide a rapidly flowing stream of hot gas substantially free of particulate and corrosive contaminants.

Another object is to provide a device capable of emitting a clean hot stream of rapidly flowing gas.

A further object is to provide a device capable of emitting a clean stream of rapidly flowing gas of predetermined initial flow rate.

Other objects will be in part apparent and in part pointed out in the description which follows.

In one of its broader aspects the objects of the invention are achieved by providing a sealed enclosure capable of withstanding a predetermined internal pressure, and one wall portion of which is subject to being ruptured at a predetermined pressure to produce an aperture capable of being heated by contact with the stream of rapidly escaping gases, said container being partially filled with fluid mono-propellant composition, and means for igniting said composition.

In describing the invention reference will be made to the drawings in which

Figure 1:
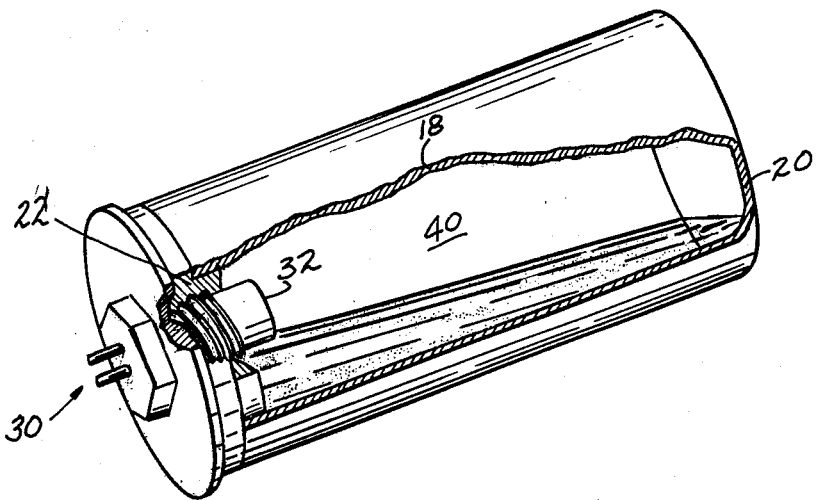
FIGURE 1 is an isometric view of a cartridge shell of the present invention, in part cut away to show the shell interior.

The liquid propellant cartridge of the present invention can take numerous forms and can be used in a variety of ways without departing from the spirit and scope of the invention. One feature which is essential to all forms of the cartridge is the heating of the gas escape port by the impingement of the rapidly flowing gases thereon. This feature is very important to the invention because any appreciable amount of fluid monopropellant in the cartridge, which might be carried from the enclosure without combustion, is subjected to combustion temperature heating conditions as it passes into contact with the heated surface of the exit port in leaving the enclosure.

Another essential feature is a substantial combustion and heating of the gas within the sealed enclosure before the hermetic seal of the enclosure is broken and the gas is released. The degree of combustion which takes place before release of the gas from the enclosure is controlled automatically by control of the thickness of at least one selected wall portion of the container. In order to provide close control over the release pressure and in order to enhance heating of the exit port surfaces as the pressure is released, it is preferred that the port be of fairly simple configuration and have well-defined edges, and that it be of sufficiently small diameter as to cause a rapid flow of gas leaving the cartridge. The rapid flow is achieved because no flow occurs until the cartridge pressure reaches a high value of the order of thousands of pounds per square inch.

One preferred embodiment of the present invention may be described by reference to FIGURES 1 and 2.

An outer casing 10, of metal or other material capable of withstanding internal pressure, is provided with a threaded collar at one side, and a gas release port 14 at the opposite side. A cavity adapted to receive a closely fitting brass, aluminum or similar metal cartridge extends between the collar and port. The cartridge inserted into this cavity comprises a relatively thin container wall 18 having the form of a tube having a flattened end closure 20 at one end and having a tight fitting plug 22 fixed at the other end. A threaded hole 24 is provided in plug 22 to receive a threaded initiator bolt 26.

The initiator bolt is in the form of a machine bolt having a hex-head outer end, an electrically activated inner end, and a threaded mid-portion. Electrical connection to the inner end of the initiator bolt is made through externally extending wires 30 which extend through the length of the bolt in insulated relation thereto to a source of electrical power not shown. An electrical igniter is located at the inner end of the bolt. This may be a conventional electrical resistance wire and chemical igniter combination or other device capable of producing a shock wave, pressure and flame sufficient to ignite a monopropellant or other liquid propellant composition. It can be activated electricaly through the wires 30. One such device is described in the copending application for Patent S.N. 857,135 filed December 3, 1959. When extended storage is contemplated, it is preferred that the igniter be hermetically sealed from the fluid propellant in chamber 40.

In this preferred embodiment the chamber 40 within the cartridge is partially filled with a liquid propellant composition having a low ash production level. The ash or total solid combustion products can be as low as about 0.05 and 0.15% solids per mole of propellant, or lower and may be substantially higher up to about 1%.

The chamber 40 is preferably filled to about 30 or 40% of its volumetric capacity with liquid monopropellant and the initiator bolt is screwed into place to hermeticaly seal the propellant within the cartridge container.

The cartridge is then inserted into the cavity 16 and an internally threaded cap 38 is screwed into place on threaded collar 12 to securely hold the cartridge in the cavity. From FIGURE 2 it is evident that this brings the flat end of the cartridge into registry with the conforming end of cavity 16.

When combustion of the propellant is initiated by a suitable shock wave, pressure and flame from the igniter 32 a pressure starts to build up rapidly in the chamber 40. When this pressure reaches a certain level, it will rupture the portion of end 20 of the cartridge positioned over the hole 14. The pressure at which this occurs will depend on the thickness of the metal 20, the size and configuration of opening 14, the composition of the metal membrane 20, and the back pressure operating on the external surface of the membrane.

Figure 2:
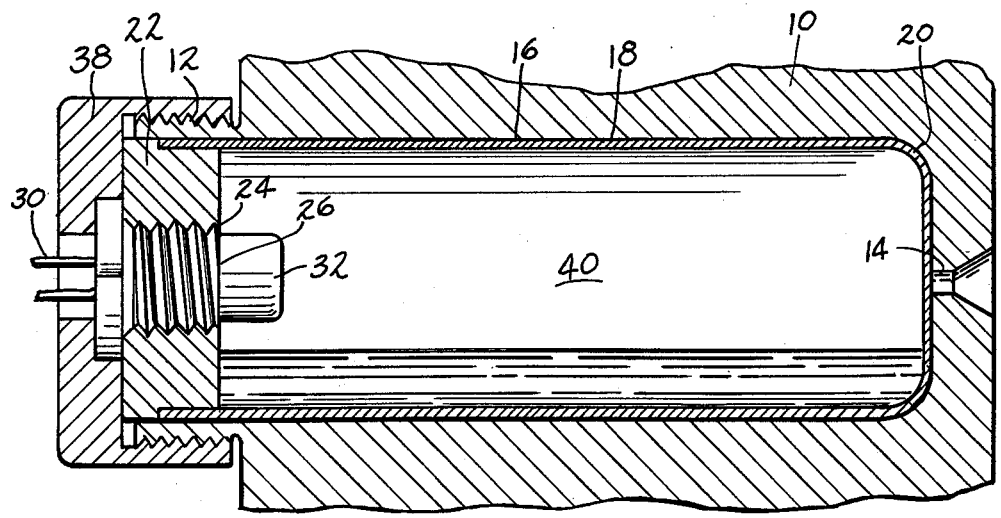
FIGURE 2 is a longitudinal section showing the shell of FIGURE 1 in place in a casing.

As indicated in FIGURE 2 a configuration which presents well defined edges such as will become heated due to impingement of the rapidly flowing heated gas thereon are preferred for use in connection with the present invention. The use of integral or auxiliary closure elements at the opening 14 such as baffles, screens, filaments, openings of irregular, cross-section e.g. star shaped, and the like to induce or control the heating effect produced by rapidly flowing gas impinging thereon is contemplated within the scope of the present invention. The temperature to which the surface is heated is well above 500° C. as it attains red heat. Exit port temperatures in excess of the flash point of the monopropellant are reached in practicing the present invention.

A number of uses can be made of this heat within the scope of the present invention. One such use is in achieving a more thorough combustion of any liquid propellant being carried through the orifice in an uncombusted state.

Another use is in controlling the rate of flow of gas through the orifice. Thus, if the orifice surface is made of a metal which is subject to melting at the temperature produced by the impingement of gas thereon, the orifice can be made subject to an automatic change in dimensions as the gas is flowing through the orifice. For this purpose an orifice wall of a metal which may be softened and deformed or melted at a lower temperature, such as copper wall, may be used. Higher melting and heat resistant steels can be used when it is desired to avoid changes of dimensions of the orifice.

Use of an automatically dilating orifice is useful when the cartridge is used to supply gas to act against a piston engaged in a cylinder, as the rate of gas delivery can be made to increase in this way to correspond to the accelerating movement of the piston.

Figure 4:
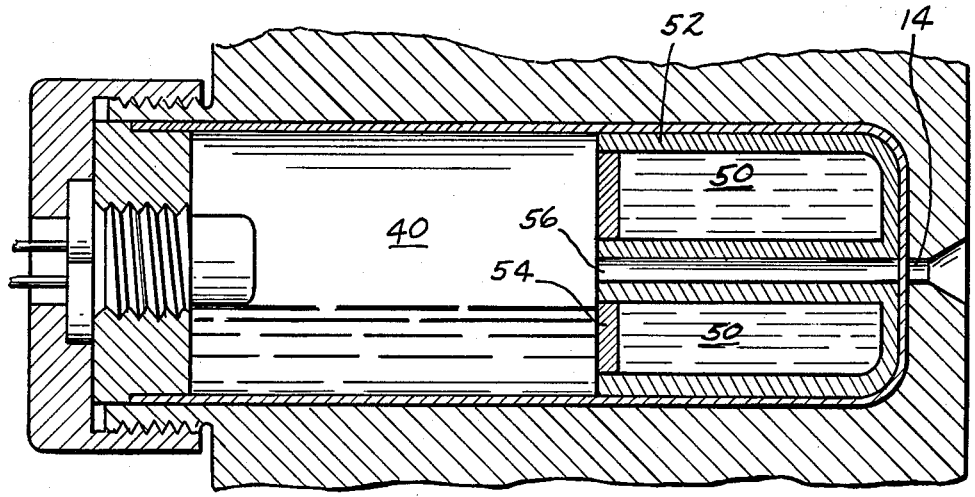
FIGURE 4 is a longitudinal sectional view of a modified cartridge such as that shown in FIGURE 2.

Another use which can be made of the heat is in the delayed ignition of a reservoir of liquid propellant in a chamber adjoining the initial ignition chamber. Such a cartridge is illustrated in FIGURE 4 as a modification of that shown in FIGURES 1 and 2. A toroidal reservoir 50 is formed within a hollow metal sleeve 52 of high melting material having a low melting and rupturable ring shaped end closure 54. The other portions of the apparatus correspond to those described above. In this modification the reservoir 50 is filled to capacity with liquid propellant. After the rapid flow of gas has heated the entrance to the central tube 56 to a sufficient degree the low melting plug will be deformed or ruptured by ignition of the monopropellant in reservoir 50. The monopropellant enters the chamber 40 and continues the discharge of gas from the cartridge through the tube 56 and the orifice 14.

By varying the relative sizes of the two reservoirs different shaped curves of the plot of pressure in the chamber against the time for build up and release of this pressure can be predetermined. Substantially none of the monopropellant which is released from chamber 40 passes through the tube 56 without having undergone combustion even though it is the subject of a delayed release. This is because the entrance to tube 56 is heated by impingement of the rapidly flowing gases there through.

Another way of taking advantage of the combustion efficiency of the subject device is by enclosing a capsule of a material which can be ruptured such as plastic or softer metal in the cartridge interior. Such a capsule, having a capability of rupturing when a certain pressure is attained to emit monopropellant from the capsule interior can prolong the release of gas from the cartridge. This is due in part to the fact that any propellant from the capsule will be efficiently ignited before leaving the cartridge due to contact with the heated exit port.

Generally, some part of the exit port of a cartridge of the present invention is heated to a temperature above the flash point of the monopropellant used in the cartridge, in the discharge of gas from the cartridge. This temperature is usually considerably above the propellant flash point and high enough to cause combustion of certain solid propellant compositions such as ammonium nitrate. Use of a slurry of ammonium nitrate in a propellant composition in the practice of the present invention gives an additional control over the shape of a time-pressure curve plotted to show the pressure change with time in the cartridge.

Figure 3:
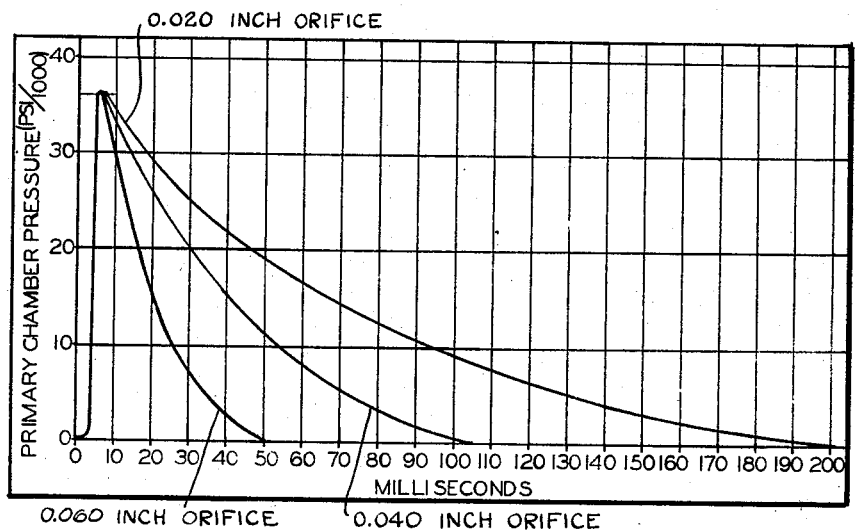
FIGURE 3 is a plot of the time-pressure relationship of gas produced in a shell such as that illustrated in FIGURE 1.

Referring now to FIGURE 3 plots are shown of typical pressure time curves obtained by firing a cartridge such as that shown in FIGURES 1 and 2. Three curves are shown and are labelled with the diameter of the orifice used. For each curve the pressure rises until rupture is about the same and occurs within about 6 or 7 milliseconds. Rupture occurs at about 38,000 pounds per square inch (p.s.i.), and the pressure then decreases as indicated. For a cartridge having an orifice diameter of 0.060 inch the total time is about 50 milliseconds. For an orifice diameter of 0.040 inch the time is about 105 milliseconds, and for an orifice diameter of 0.020 inch the time is about 200 milliseconds. For these runs a brass rupture disk of 0.010 inch thickness was used. The propellant was 20% ethyl nitrate in normal propyl nitrate. A loading density of 24.6% was used. Thinner disks cause rupture at lower pressures and thicker disks are ruptured at higher pressure.

The pressure must of course be high enough to rupture the disk used in order to practice the present invention. However, a number of tests of loading density versus peak pressure can be made to be sure that the disk will rupture. The disk here refers to the disc or similar configuration of metal which covers the cartridge exit orifice. The loading density refers to the percentage of cartridge volume which is filled with propellant. For example, a fifteen cubic centimeter bomb (a cartridge having no exit port) loaded to 14% of capacity with normal propyl nitrate has a peak pressure of about 20,000 p.s.i., at 22.5% loading density a pressure of about 39,000 p.s.i. is attained and at 27.5% loading density a pressure of about 50,000 p.s.i. is produced in the bomb. Loading densities as high as 60 or 70% may be used with certain propellant compositions because of the heating of the exit port surface above the propellant flash point temperature. Normal propyl nitrate flashes at about 600° C.

The peak pressure reached in a cartridge which does rupture can also be changed by a change in propellant composition for a constant loading density and constant rupture disc thickness. Thus using pure normal propyl nitrate a peak pressure of 35,000 p.s.i. was obtained whereas for 20%, 40% and 50% ethyl nitrate in propyl nitrate the peak pressures were 37,500; 41,000 and 42,000 p.s.i. respectively.

The cartridge of the present invention is useful in providing a clean gas under pressure to activate an apparatus such as a piston enclosed within a cylinder which is activated by gas pressure. The advantages of the low ash formation are particularly evident when a device has moving parts which operate a number of times under relatively close tolerances and are caused to jam due to deposit of surface contaminations or corrosive agents. The improvement made possible by this invention is comparable to that made possible by the development of smokeless powder, in that automatic hand weapons could then be operated for the first time without fouling and jamming due to deposits of surface contaminants from black powder.

Numerous applications can be made of this device as for example in activating a hydraulic jack, operating safety devices in elevators, and releasing aircraft landing gear which do not work in the normal fashion. Many liquid propellant compositions can be used in the device and many modifications may be made in the ignition, loading density and configuration as discussed above and in a variety of other ways without departing from the scope of the invention.

One such modification involves use of a plastic or reinforced plastic casing for the cartridge and for the rupture disc. Such cartridges are particularly suitable for use with liquid propellants because of the relatively short burning period of the liquid propellant compositions in this application. Plastic cartridges are also particularly suitable for the lower pressure gas cartridge uses as the plastic wall of the cartridge serves well as a low pressure rupture disc. The orifice of the cartridge must be composed of a material which is heated to above the flash point of the propellant by the escaping gases.

The liquid propellants have advantages over the solid propellants in another way. This is the freedom of liquid propellants from the effects of thermal cycling. Thermal cycling of solid propellants can cause cracks which interfere with the uniform burning rate and may even cause ignition of the propellant. By contrast the cartridges of the present invention have been temperature cycled from $-105°$ F. to $+200°$ F. with no deterioration of results and has been fired repeatedly at $-110°$ F. although this is not the low temperature limit.

The liquid propellants also are advantageous in their lower combustion temperature as compared to solid propellants. Thus, for normal nitro propane the burning temperature is about 2000° F. Nitro-methane burns at a considerably higher temperature. The liquid propellant gas cartridges of the present invention are therefore advantageous in that although complete and efficient combustion is achieved the exit gas temperatures are not as high as those produced by a solid propellant cartridge.

Loading density as this term is used in the propellant field usually refers to the weight of propellant in grams divided by the volume of the container in cubic centimeters. For a propellant such as the normal propyl nitrate referred to above having a density of about one, the loading density can also be expressed in terms of an approximate volumetric ratio or percentage as above.

Since many examples of the foregoing procedures, compositions and articles may be carried out and made, and since many modifications can be made in the procedures, compositions and articles described without departing from the scope of the subject invention, the foregoing is to be interpreted as illustrative only, and not as defining or limiting the scope of the invention.

What is claimed is:

An article for generating a high velocity flow of clean heated gas which comprises a cartridge adapted to be enclosed within a pressure resistant housing, said cartridge having a closure means at one end containing a propellant igniting means, the opposite end of the cartridge being in contact with a gas exit port in said pressure resistant housing, the portion of said cartridge in contact with said port being subject to rupture at a predetermined pressure, said cartridge being divided into a rear chamber adjacent to the end having said propellant igniting means and a forward chamber at the opposite end, said forward chamber having a conduit centrally positioned therein to connect said rear chamber with the portion of said cartridge adjacent to said gas exhaust port, said forward chamber being separated from said rear chamber by means of a rupturable ring-shaped enclosure, said forward chamber being filled with liquid propellant, said rear chamber containing freely distributed therein a quantity of liquid propellant sufficient to partially fill said rear chamber and to yield after ignition a pressure above that required to rupture the portion of said cartridge adjacent to said gas exit port.

References Cited in the file of this patent
UNITED STATES PATENTS

| | | |
|---|---|---|
| 950,550 | Leavitt | Mar. 1, 1910 |
| 1,191,299 | Goddard | July 18, 1916 |
| 1,506,323 | O'Neill | Aug. 26, 1924 |
| 1,611,353 | Lepinte | Dec. 21, 1926 |
| 2,206,057 | Skinner | July 2, 1940 |
| 2,700,337 | Cumming | Jan. 25, 1955 |
| 2,912,820 | Whitmore | Nov. 17, 1959 |

FOREIGN PATENTS

| | | |
|---|---|---|
| 405,645 | Great Britain | Jan. 29, 1934 |